United States Patent

Bowden, Jr. et al.

(10) Patent No.: US 6,996,906 B2
(45) Date of Patent: Feb. 14, 2006

(54) METHOD OF REPAIRING A TURBINE BLADE AND BLADE REPAIRED THEREBY

(75) Inventors: Joseph Howell Bowden, Jr., Mason, OH (US); Timothy Lee Arney, Cincinnati, OH (US); Warren Davis Grossklaus, Jr., West Chester, OH (US); Lawrence Joseph Roedl, West Chester, OH (US)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 10/248,085

(22) Filed: Dec. 17, 2002

(65) Prior Publication Data

US 2004/0112883 A1 Jun. 17, 2004

(51) Int. Cl.
 B23P 6/00 (2006.01)
 B23P 15/02 (2006.01)
 B21K 3/04 (2006.01)

(52) U.S. Cl. ............ 29/889.1; 29/889; 29/889.7; 228/119; 219/137.2

(58) Field of Classification Search ........... 228/119, 228/159, 160; 29/889, 889.1, 889.7; 219/137.2
See application file for complete search history.

(56) References Cited

U.S. PATENT DOCUMENTS

| | | | | | |
|---|---|---|---|---|---|
| 4,878,953 | A | * | 11/1989 | Saltzman et al. | 148/512 |
| 5,152,058 | A | * | 10/1992 | Legros | 29/889.1 |
| 5,554,837 | A | * | 9/1996 | Goodwater et al. | 219/121.63 |
| 5,846,057 | A | * | 12/1998 | Ferrigno et al. | 416/241 R |
| 6,154,959 | A | * | 12/2000 | Goodwater et al. | 29/889.1 |
| 6,376,801 | B1 | * | 4/2002 | Farrell et al. | 219/124.34 |
| 6,595,749 | B1 | * | 7/2003 | Lee et al. | 416/97 R |

FOREIGN PATENT DOCUMENTS

JP 62-282796 A * 12/1987

* cited by examiner

*Primary Examiner*—Lynne R. Edmondson
(74) *Attorney, Agent, or Firm*—David L. Narciso; Gary M. Hartman; Domenica N. S. Hartman

(57) ABSTRACT

A method of repairing a turbine blade and the blade repaired thereby. The blade comprises a platform that has become bowed as a result of high temperature creep, with the result that the platform has a concave surface and an oppositely-disposed convex surface. The method generally comprises welding the concave surface to build up a weldment on the concave surface, cooling the weldment during which the weldment shrinks, the convex surface becomes flatter, and the concave surface beneath the weldment becomes flatter, and then removing a surface portion of the weldment so as to create a substantially flat weldment surface overlying the substantially straightened concave surface.

22 Claims, 1 Drawing Sheet

METHOD OF REPAIRING A TURBINE BLADE AND BLADE REPAIRED THEREBY

BACKGROUND OF INVENTION

1. Field of the Invention

The present invention generally relates to methods for repairing components subjected deformation as a result of high temperature creep, such as turbine blades of gas turbine engines. More particularly, this invention relates to a method of repairing a gas turbine engine blade whose platform has become bowed as a result of high temperature creep.

2. Description of the Related Art

High temperature nickel-base superalloys are widely used in the manufacture of components for the high temperature sections of gas turbine engines. Such components, which include nozzles, combustors, and turbine vanes and blades, are under strenuous high temperature conditions during engine operation that can lead to various types of damage or deterioration. Because the material and processing costs of superalloys are relatively high, restoration and repair of damaged or worn superalloy components are typically preferred to replacement. For this purpose, various weld repair methods have been developed, including those using tungsten inert gas (TIG) and plasma transferred arc (PTA) welding processes performed at room and elevated temperatures to improve welding yields and ensure that the mechanical properties of the superalloy are maintained. Particularly suitable welding processes, referred to as superalloy welding at elevated temperatures (SWET), are disclosed in U.S. Pat. Nos. 6,020,511, 6,124,568 and 6,297,474. SWET welding processes are performed within an enclosure in which a controlled atmosphere and temperature are maintained to inhibit cracking and oxidation of a superalloy component being repaired.

A particular example of damage that can occur is the result of high temperature creep to which rotating gas turbine components are susceptible. Platforms of gas turbine engine blades can become bowed as a result of high temperature creep, necessitating scrappage of the blade if the bow is excessive. In view of the high material and processing costs of turbine blades, it would be desirable if blades that have sustained excessive platform bow could be repaired and restored to extend their service life.

SUMMARY OF INVENTION

The present invention provides a method of repairing a turbine blade having a platform that has become bowed as a result of high temperature creep during engine operation, with the result that the platform has a concave surface and an oppositely-disposed convex surface. The method generally comprises welding the concave surface to build up a weldment thereon, and then cooling the weldment during which the weldment shrinks. During cooling, the convex surface becomes flatter and the concave surface beneath the weldment becomes flatter. A surface portion of the weldment is then removed so as to create a substantially flat surface that is defined by the weldment. In addition to the method, the present invention also encompasses the resulting repaired turbine blade.

According to the above, a particular aspect of the method of this invention is that the weldment is built up on the concave surface of the platform, instead of the convex surface. While shrinkage of the weldment during cooling would suggest that the weldment would actually cause the concave surface to become more concave, thereby exacerbating the bow in the platform, the opposite has been shown to occur. While not wishing to be held to any particular theory, the cause for the straightening (flattening) of the platform is believed to be related to the mixing of the thermally-deformed metal (of the platform) with new metal (of the weldment) and the generation of in-plane stresses that cause the convex surface to contract and/or cause the concave surface to expand. These stresses are then believed to be maintained by the weldment remaining on the previously concave surface of the platform. To promote the ability of the weldment to maintain the restored shape of the platform, the weldment is preferably formed of a material of similar strength and properties to the platform. For example, both the platform and the weldment are formed of gamma-prime strengthened nickel-base superalloys.

In view of the above, it can be seen that a significant advantage of this invention is that turbine blades whose platforms have been damaged as a result of high temperature creep can be repaired to extend their service life beyond that otherwise possible. The process is relatively uncomplicated, and provides a reliable and economical method to reducing maintenance costs.

Other objects and advantages of this invention will be better appreciated from the following detailed description.

DETAILED DESCRIPTION

Figure 1:
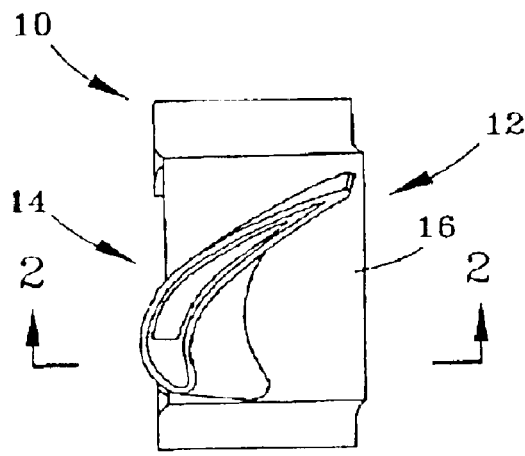
FIGS. 1 and 2 are an end view and cross-sectional view, respectively, of a turbine blade with a bowed platform.

An example of a high pressure turbine blade 10 is represented in FIG. 1. The blade 10 has a platform 12 and an airfoil 14 that extends roughly perpendicular from an outer surface 16 of the platform 12. The blade 10 also has a dovetail 20 (FIGS. 2 through 4) that extends roughly perpendicular from an oppositely-disposed inner surface 18 of the platform 12, and serves to anchor the blade 10 to a turbine disk (not shown). Hot combustion gases are directed at the airfoil 14 and the outer surface 16 of the platform 12 during operation of the gas turbine engine in which the blade 10 is installed. Because the blade 10 is also subjected to high stresses during engine operation, the blade 10 is also subjected to high temperature creep. As a result of its severe operating conditions, the blade 10 is preferably formed from a nickel-base superalloy, more preferably a gamma-prime strengthened nickel base superalloy, though it is foreseeable that other materials could be used. Particularly suitable superalloys for the blade are gamma prime-strengthened alloys such as René 80 and René 142, both of which are known alloys having high gamma prime content. René 80 has the following nominal composition by weight: about 14% chromium, 9.5% cobalt, 4.8% titanium, 3% aluminum, 4% molybdenum, 4% tungsten, 0.17% carbon, 0.75% hafnium, 0.01% zirconium, and 0.015% boron, the balance nickel and incidental impurities. René 142 has the following nominal composition by weight: about 12% cobalt, 6.8% chromium, 6.15% aluminum, 1.5% molybdenum, 4.9% tungsten, 6.35% tantalum, 2.8% rhenium, 1.5% hafnium, 0.12% carbon, and 0.015% boron, the balance nickel and incidental impurities. Both alloys are formulated as directionally-solidified (DS) alloys.

Figure 2:
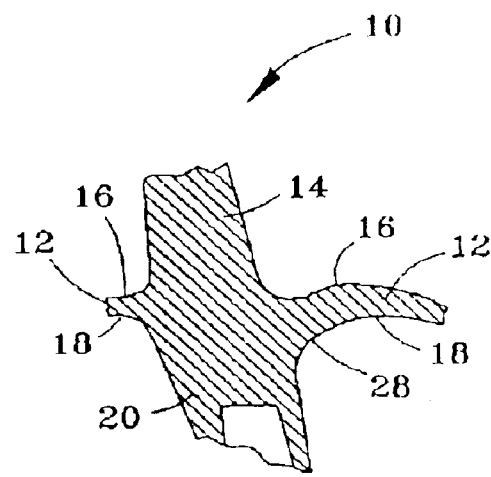
Figure 3:
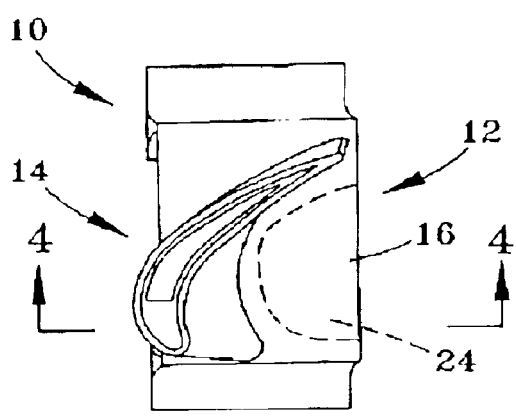
FIGS. 3 and 4 are end and partial cross-sectional views similar to FIGS. 1 and 2, respectively, and depict the blade as it appears with a weldment built up on the platform in accordance with the present invention.
Figure 4:
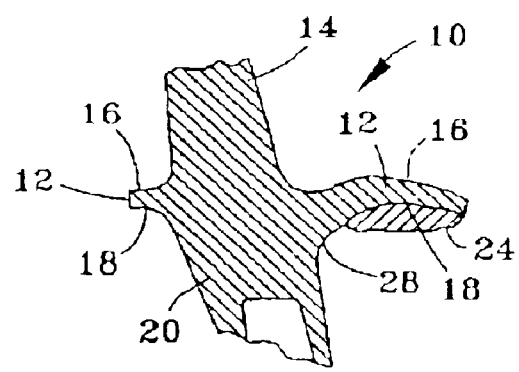

In its original as-manufactured condition, the platform 12 and its surfaces 16 and 18 are substantially planar. In contrast, the platform 12 shown in FIG. 2 is represented as being deformed (bowed) as a result of high temperature creep, with the outer surface 16 of the platform 12 being convex and the inner surface 18 of the platform 12 being concave. As depicted in FIG. 2, the curvature of the bowed platform 12 is generally in a direction toward the airfoil 14 and away from the dovetail 20. In accordance with the invention, the platform 12 and its surfaces 16 and 18 can be returned to their substantially planar as-manufactured condition by building up a weldment on the inner surface 18 as represented in FIGS. 3 and 4.

In preparation for welding, the inner surface 18 of the platform 12 preferably undergoes a surface treatment (blending) to remove oxides, evidence of environmental attack, and any other surface contaminants that could interfere with the welding operation. The surface treatment may be performed using an abrasive hand tool or other suitable equipment. In FIGS. 3 and 4, the inner (concave) surface 18 of the platform 12 is shown as having been surface welded to build up a weldment 24 that extends out to the perimeter of the platform 12, generally covering a crescent-shaped portion of the inner surface 18 as depicted in FIG. 3. As seen in FIGS. 3 and 4, the weldment 24 preferably avoids the fillet 28 at the intersection between the dovetail 20 and the inner surface 18, since the fillet 28 is thicker and therefore more susceptible to cracking during welding. The material for the weldment 24 preferably has similar properties to the material for the blade 10. For example, for a blade 10 formed of one of the previously-noted gamma-prime strengthened nickel base superalloy, the material for the weldment 24 is also preferably a gamma-prime strengthened nickel base superalloy, more preferably René 80 and René 142. Notably, attempts to use solution-strengthened nickel-base superalloys to repair blades formed of gamma-prime strengthened nickel base superalloys have not produced the desired results.

In order to be effective, the weldment 24 should not penetrate the entire thickness of the platform 12 (the distance between the outer and inner surfaces 16 and 18), but instead preferably penetrates roughly half the thickness of the platform 12, e.g., to a depth of about 0.030 inch (about 0.8 mm) for a platform 12 having a typical thickness of about 0.065 inch (about 1.65 mm). In addition, the weldment 24 is preferably deposited in multiple adjacent weld passes, each along a substantially crescent-shaped path corresponding to the crescent-shaped edge of the weldment 24 shown in FIG. 3. The weldment 24 is also preferably deposited to a single weld-pass (bead) depth, and is thinner toward the ends of the weldment 24 (near the fillet 28 and the platform perimeter) and thicker at the middle where the surface 18 of the platform 12 is displaced farthest from its desired position. As a result, the weldment 24 has a generally crescent-shaped cross-section and the surface of the weldment 24 is roughly planar, as depicted in FIG. 4. The method of this invention does not require any weldment deposited on the outer (convex) surface 16 of the platform 12.

While various welding techniques may be capable of achieving the objects of this invention, the weldment 24 is preferably built up using the TIG welding techniques and apparatuses of the type disclosed in U.S. Pat. Nos. 6,020,511, 6,124,568 and 6,297,474, all of which are incorporated herein by reference. Conventional TIG welding techniques that do not provide the controlled atmosphere and temperature environment provided by the preferred TIG welding techniques have been found to create the desired movement of the platform 12, but have caused cracking in the platform 12 during cooldown. A standard TIG power supply may be used, or a polarity-reversing plasma transferred arc (PTA) supply. Suitable approximate TIG welding parameters are summarized in Table I below.

TABLE I

| Electrode | 0.062 inch (1.6 mm) diameter pointed tungsten, 2% thoriated |
|---|---|
| Torch Gas | 20 to 25 CFH argon |
| Backup Gas | 45 to 55 CFH argon (TIG welding enclosure) |
| Weld material | René 80 (0.030 inch (0.8 mm) diameter weld wire) |
| Weld current | 20 to 35 amps |

Figure 5:
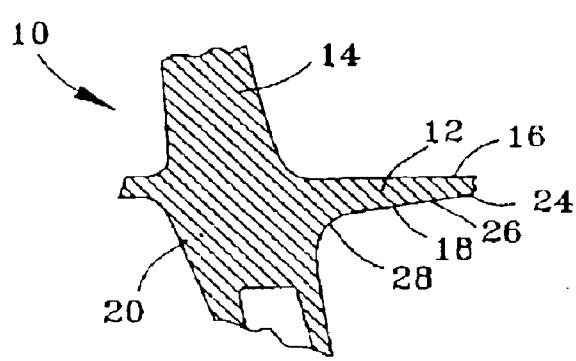
FIG. 5 is a partial cross-sectional view similar to FIG. 2, and depicts the result of post-weld cooling and machining of the platform in accordance with the present invention.

Following the welding operation, the blade 10 is allowed to cooldown in accordance with known practices to avoid weld-induced cracking. As a result of being welded in the manner described above, the platform 12 straightens during cooling to a degree that, aside from the weldment 24, substantially reestablishes the original as-manufactured planar form of the platform 12. FIG. 5 depicts the appearance of the blade 10 following cooldown from the welding operation and following blending of the surface of the weldment 24 with the adjacent exposed region of the surface 18, to yield a substantially flat weldment surface 26 that is generally parallel to the underlying and now straightened inner surface 18 of the platform 12. As such, the weldment 24 is significantly reduced in thickness, though substantially remaining on the surface region on which the weldment 24 was originally deposited. In practice, a remaining built-up weldment thickness of up to about 0.005 inch (about 0.1 mm) above the adjacent surface region is believed to be suitable, resulting in the platform 12 very nearly having its as-manufactured dimensions.

The remaining weldment 24 is believed to not only straighten the platform 12, but also strengthen the platform 12 to inhibit re-bowing. The strength of a gamma-prime strengthened nickel base superalloy, such as one of the two alloys noted above, is particularly effective for this reason. The mechanism by which the platform 12 becomes straightened is not well understood. However, several events are believed to contribute to the desired results. First, the welding operation results in the mixing within the weld penetration zone of the metal damaged by high temperature creep and the new metal (weldment 24) deposited by welding. The deformation in the platform 12 is observed to be corrected as the weldment 24 shrinks during cooling, and this shrinkage is believed to induce tensile stresses in the original metal within the platform 12 that pull the platform 12 toward its original contour. These tensile stresses are believed to be induced by the weldment 24 in the outer surface 16, while compressive stresses are induced in the inner surface 18. Once the original shape of the platform 12 is reestablished, blending of the weldment 24 enables the original dimensions of the platform 12 to be nearly reestablished, yet allows sufficient weldment 24 to remain to maintain the desired shape. Engine testing of blades formed of and repaired with René 80 in accordance with the parameters disclosed in Table I above have shown that the restored platform shape is not lost during a period in which platforms of identical new blades are bowed beyond acceptable service limits.

While the invention has been described in terms of a preferred embodiment, it is apparent that other forms could be adopted by one skilled in the art. Therefore, the scope of the invention is to be limited only by the following claims.

What is claimed is:

1. A method for repairing a turbine blade having a platform that is bowed so that a first surface of the platform is concave and an oppositely-disposed second surface of the platform is convex, the method comprising the steps of:

welding the first surface to build up a weldment thereon;

cooling the weldment during which the weldment shrinks and stresses are induced in the platform that straighten the platform to cause the second surface and the first surface beneath the weldment to become flatter; and then removing a surface portion of the weldment so as to create a substantially flat surface that is defined by the weldment.

2. A method according to claim 1, wherein the first surface of the platform is adjacent a dovetail of the blade and the second surface of the platform is adjacent an airfoil of the blade.

3. A method according to claim 1, wherein a fillet exists between the first surface and the dovetail, and the weldment is not built up on the fillet during the welding step.

4. A method according to claim 1, wherein the weldment penetrates about one-half the thickness of the platform between the first and second surfaces as a result of the welding step.

5. A method according to claim 1, wherein the welding step is performed as a TIG welding operation.

6. A method according to claim 1, wherein the platform and the weldment are formed of gamma-prime strengthened nickel-base superalloys.

7. A method according to claim 1, wherein the weldment remaining after the removing step has a built-up thickness of up to about 0.1 mm and covers a substantially crescent-shaped region of the first surface.

8. A method according to claim 7, wherein the gamma-prime strengthened nickel-base superalloy of the weldment has a nominal composition consisting essentially of, by weight, about 14% chromium, about 9.5% cobalt, about 5% titanium, about 3% aluminum, about 4% molybdenum, about 4% tungsten, about 0.03% zirconium, about 0.17% carbon and about 0.015% boron, the balance nickel and incidental impurities.

9. A method according to claim 7, wherein the gamma-prime strengthened nickel-base superalloy of the weldment has a nominal composition consisting essentially of, by weight, about 12% cobalt, about 6.8% chromium, about 6.15% aluminum, about 1.5% molybdenum, about 4.9% tungsten, about 6.35% tantalum, about 2.8% rhenium, about 1.5% hafnium, about 0.12% carbon, and about 0.015% boron, the balance nickel and incidental impurities.

10. The turbine blade repaired by the method according to claim 1.

11. The turbine blade repaired by the method according to claim 7.

12. A method for repairing a turbine blade formed of a gamma-prime strengthened nickel-base superalloy and comprising an airfoil, a dovetail, and a platform separating the airfoil and dovetail, the platform having a first surface adjacent the dovetail and an oppositely-disposed second surface adjacent the airfoil, the platform being bowed as a result of creep such that the first surface is concave and the second surface is convex, the method comprising the steps of:

TIG welding the first surface to build up a weldment thereon, the weldment being formed of a gamma-prime strengthened nickel-base superalloy;

cooling the weldment during which the weldment shrinks and stresses are induced in the platform that straighten the platform to cause the second surface and the first surface beneath the weldment to become flatter; and then removing a surface portion of the weldment so as to create a substantially flat outer surface that is defined by the weldment and is substantially parallel to the first surface.

13. A method according to claim 12, wherein a fillet exists between the first surface and the dovetail, and the weldment is not built up on the fillet during the welding step.

14. A method according to claim 12, wherein the weldment penetrates about one-half the thickness of the platform between the first and second surfaces as a result of the welding step.

15. A method according to claim 12, wherein the weldment remaining after the removing step has a built-up thickness of up to about 0.1 mm and covers a substantially crescent-shaped region of the first surface.

16. A method according to claim 12, wherein the gamma-prime strengthened nickel-base superalloy of the weldment has a nominal composition consisting essentially of, by weight, about 14% chromium, about 9.5% cobalt, about 5% titanium, about 3% aluminum, about 4% molybdenum, about 4% tungsten, about 0.03% zirconium, about 0.17% carbon and about 0.015% boron, the balance nickel and incidental impurities.

17. A method according to claim 12, wherein the gamma-prime strengthened nickel-base superalloy of the weldment has a nominal composition consisting essentially of, by weight, about 12% cobalt, about 6.8% chromium, about 6.15% aluminum, about 1.5% molybdenum, about 4.9% tungsten, about 6.35% tantalum, about 2.8% rhenium, about 1.5% hafnium, about 0.12% carbon, and about 0.015% boron, the balance nickel and incidental impurities.

18. The turbine blade repaired by the method according to claim 12.

19. The turbine blade repaired by the method according to claim 12, wherein the weldment penetrates about one-half the thickness of the platform between the first and second surfaces, has a built-up thickness of up to about 0.1 mm, and covers a substantially crescent-shaped region of the first surface.

20. The turbine blade repaired by the method according to claim 12, wherein the gamma-prime strengthened nickel-base superalloy of the weldment has a nominal composition consisting essentially of, by weight, either:

about 14% chromium, about 9.5% cobalt, about 5% titanium, about 3% aluminum, about 4% molybdenum, about 4% tungsten, about 0.03% zirconium, about 0.17% carbon and about 0.015% boron, the balance nickel and incidental impurities; or about 12% cobalt, about 6.8% chromium, about 6.15% aluminum, about 1.5% molybdenum, about 4.9% tungsten, about 6.35% tantalum, about 2.8% rhenium, about 1.5% hafnium, about 0.12% carbon, and about 0.015% boron, the balance nickel and incidental impurities.

21. A method according to claim 1, wherein the welding step is not performed on the second surface of the platform and the weldment on the platform is limited to the first surface thereof.

22. A method according to claim 12, wherein the TIG welding step is not performed on the second surface of the platform and the weldment on the platform is limited to the first surface thereof.

* * * * *